Figure 1:
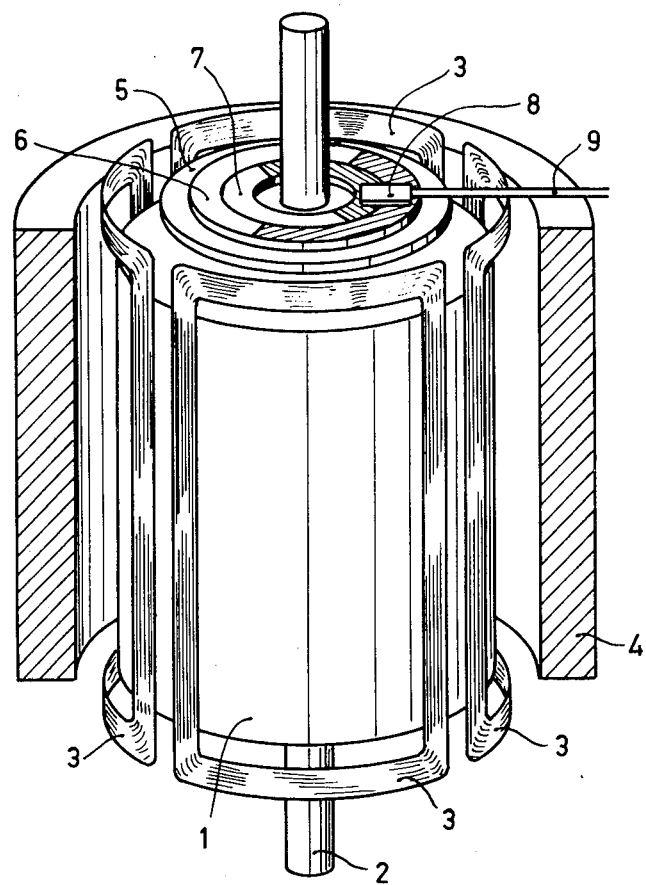

United States Patent [19]

Janssen

[11] 4,074,173

[45] Feb. 14, 1978

[54] ELECTRIC MACHINE

[75] Inventor: Johannes Hendrikus Hubertus Janssen, Eindhoven, Netherlands

[73] Assignee: U.S. Philips Corporation, New York, N.Y.

[21] Appl. No.: 653,084

[22] Filed: Jan. 28, 1976

[30] Foreign Application Priority Data

Mar. 14, 1975 Netherlands ............................ 7503046

[51] Int. Cl.² .................................................. H02K 29/00
[52] U.S. Cl. ........................................ 318/138; 318/254; 318/439
[58] Field of Search ........................ 318/138, 254, 439

[56] References Cited

U.S. PATENT DOCUMENTS

| 3,681,669 | 8/1972 | Ayers | 318/254 X |
| 3,720,865 | 3/1973 | Bregeault | 318/254 |
| 3,831,071 | 8/1974 | Mitsui | 318/254 |
| 3,898,544 | 8/1975 | Tanikoshi | 318/254 |
| 3,900,780 | 8/1975 | Tanikoshi | 318/254 |
| 3,903,463 | 9/1975 | Kanamori | 318/254 |

Primary Examiner—Gene Z. Rubinson
Attorney, Agent, or Firm—Frank R. Trifari; Bernard Franzblau

[57] ABSTRACT

The invention relates to a collectorless d.c. machine which is provided with a disc which rotates with the rotor, in which disc magnetically coded tracks are provided which co-operate with magneto-sensitive elements for selectively energizing the stator coils depending on the rotor position. The invention in particular relates to a three-phase motor, while on a disc on the rotor shaft two magnetic codes are provided which are shifted through 120° relative to each other. The magnetic codes are separately detected by a magneto-sensitive element. The two elements together with the associated electronic circuitry which amplifies the two signals and produces a third signal which has a 120° phase shift relative to the two other signals, take the form of one integrated circuit.

12 Claims, 5 Drawing Figures

ELECTRIC MACHINE

The invention relates to an electric machine comprising an electronic commutator and a rotor which at least partly consists of a magnetic material and co-operates with stationary stator coils. This machine is provided with a number of magneto-sensitive elements, in particular Hall elements, for selectively applying electric current to the stator coils depending on the rotor position.

Such a machine is known from U.S. Pat. 3,486,099, in which machine said coils consist of two centre-tapped coils which are arranged at 90° relative to each other. The rotor is made of a permanent-magnet material with a diametrical North-South magnetization. In the magnetic field of this rotor two Hall elements are disposed, which are actually disposed at an angle of 90° relative to the rotor axis. Thus, the field of the rotating rotor induces signals in the Hall elements with a phase difference of 90°, which signals control the current through said coils so that a rotary field is produced in synchronism with the rotor movement.

The same principle may also be used in other motors, such as three-phase motors, for example by arranging three Hall elements at 120° relative to each other.

The known field detection method for controlling the current through the stator coils has the drawback that for each Hall element required, a space is necessary between the stator and rotor. Moreover for each Hall element a number of signal and supply leads must be provided.

It is an object of the invention to provide a machine which does not have said drawback and the invention is therefore characterized in that a multiplicity of magnetically coded tracks are formed on a body which is connected to the rotor, which tracks each co-operate with a magneto-sensitive element.

When using a machine according to the invention the Hall elements may be disposed at substantially any suitable location in or, if necessary, outside the machine.

For simplicity of construction the magnetically coded tracks in a preferred embodiment of a machine according to the invention are concentric rings which are disposed on a disc-shaped body which is disposed substantially parallel to one of the axial bounding surfaces of the rotor on the rotor shaft.

Apart from the previously mentioned drawbacks of the known motor, the use of spatially displaced Hall elements is a disadvantage during assembly of the motor because, for each Hall element, a number of mechanical and electrical connections must be made, while the mutual position must be accurately adjusted.

As in the machine according to the invention several more or less independently coded tracks can be provided, the invention, in order to mitigate the last-mentioned drawbacks, is further characterized in that the magneto-sensitive elements are disposed on one carrier plate.

When using magneto-sensitive elements which can be manufactured from semiconductor materials, as is the case with Hall elements, it is particularly advantageous according to the invention to provide a carrier plate made of a semiconductor crystal, in which said magneto-sensitive elements are arranged, together with an amplifier circuit, by means of integrated circuit technology. The amplifier circuit amplifies the signals from the magnetosensitive elements, the outputs of said amplifier circuit leading to the stator coils.

With respect to the mutual position of the magnetically coded tracks, an electric machine according to the invention, with n phases, is characterized in that n-magneto-sensitive elements are disposed on one carrier plate and are spaced relative to a first magneto-sensitive element through angles of $\phi_i$, where $i$ equals $2 \ldots n$, and that the tracks which co-operate with the corresponding magneto-sensitive elements are spaced relative to a first track through angles of $$\frac{360°}{n}(i-1) - \phi_i.$$

Here, the index $i$ is a sequence number. The $n$ magneto-sensitive elements make angles of $\phi_2 \ldots$ to $\phi_n$ relative to a first element and the corresponding n magnetically coded tracks are spaced through angles of $$\frac{360°}{n} - \phi_2 \ldots \text{to} \ldots \frac{360°}{n}(n-1) - \phi_n$$

relative to a corresponding first track.

The invention further relates to a three-phase machine.

In three-phase machines three magneto-sensitive elements may be used for producing signals with a mutual phase difference of 120°, which signals supply the three stator coils. When, for example, Hall elements are employed as magneto-sensitive elements, and when said Hall elements are included in an electronic circuit in a similar manner to that described in the cited U.S. Patent, two mutually 180° phase-shifted signals will be available per Hall element. When two Hall elements are used which are spatially shifted relative to the rotor axis through 120°, two of the four signals yield a third phase when added, so that with only two Hall elements three-phase signals can be realized.

Since the use of a machine according to the invention allows the magneto-sensitive elements, including the associated electronic circuit, to be incorporated in one integrated circuit, it is advantageous for an electric three-phase machine according to the invention, which is provided with two Hall elements, of which the Hall electrodes are connected to amplifier circuits whose output lead to the stator coils, that one Hall electrode of the one Hall element, or a point of the amplifier circuit driven thereby, be connected to one Hall electrode of the other Hall element, or a corresponding point of the amplifier circuit driven thereby, while the amplifier circuit may be a common circuit up from said interconnections and the output(s) thereof is (are) connected to one of the stator coils.

Such a machine according to the invention, adapted for three-phase operation and equipped with two magnetically coded tracks which co-operate with two magneto-sensitive elements which are included in one integrated circuit, is more advantageous than a three-phase machine according to the invention which is equipped with three magnetically coded tracks which co-operate with three-magneto-sensitive elements in one integrated circuit especially in the case of mass production of inexpensive machines. In that case no stringent requirements have to be imposed on the tolerances of the width of the magnetically coded tracks because it is sufficient that the two magneto-sensitive elements be located one on each side of the bounding line between the two tracks. If three tracks with three magneto-sensitive elements are used, the tolerances of the centre track should meet stringent requirements because said centre track co-operates with the centre magneto-sensitive element which is included in the integrated circuit, whose dimensions are limited for technological reasons.

Figure 2:
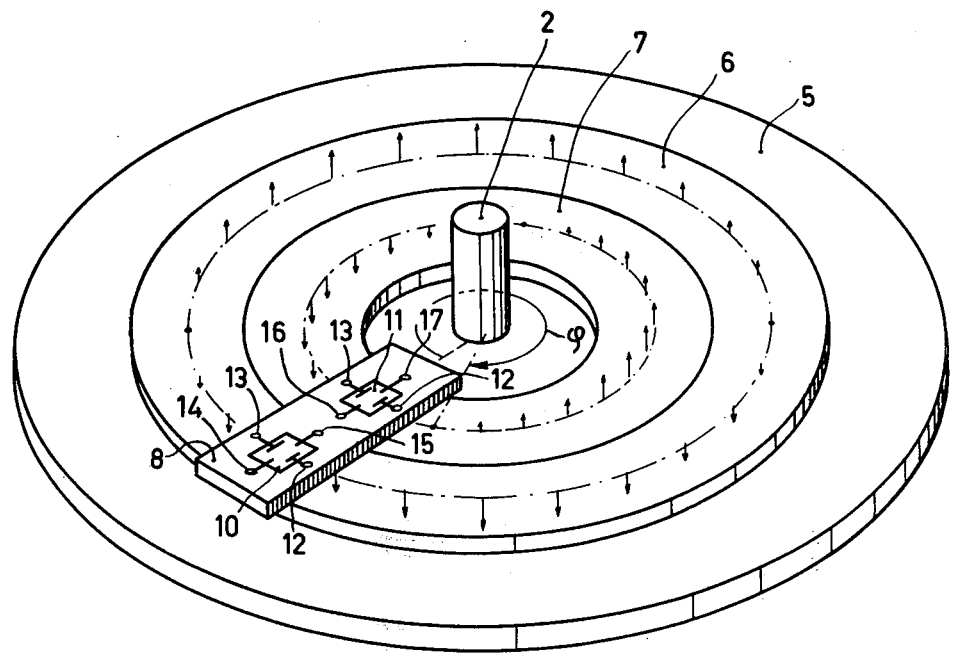
Figure 3:
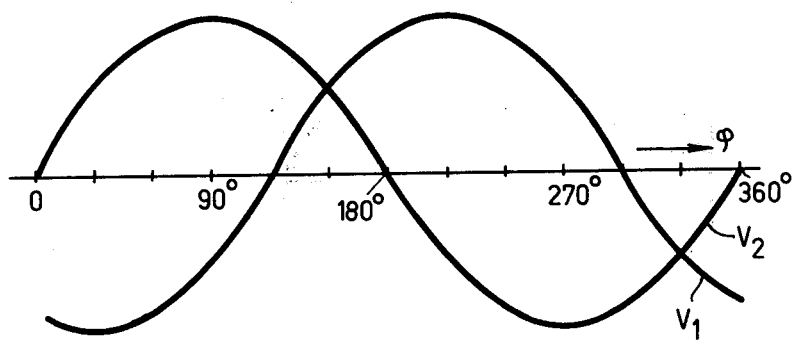
Figure 4:
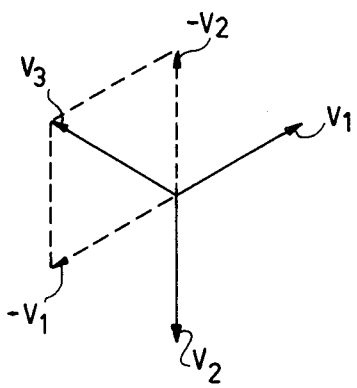
Figure 5:
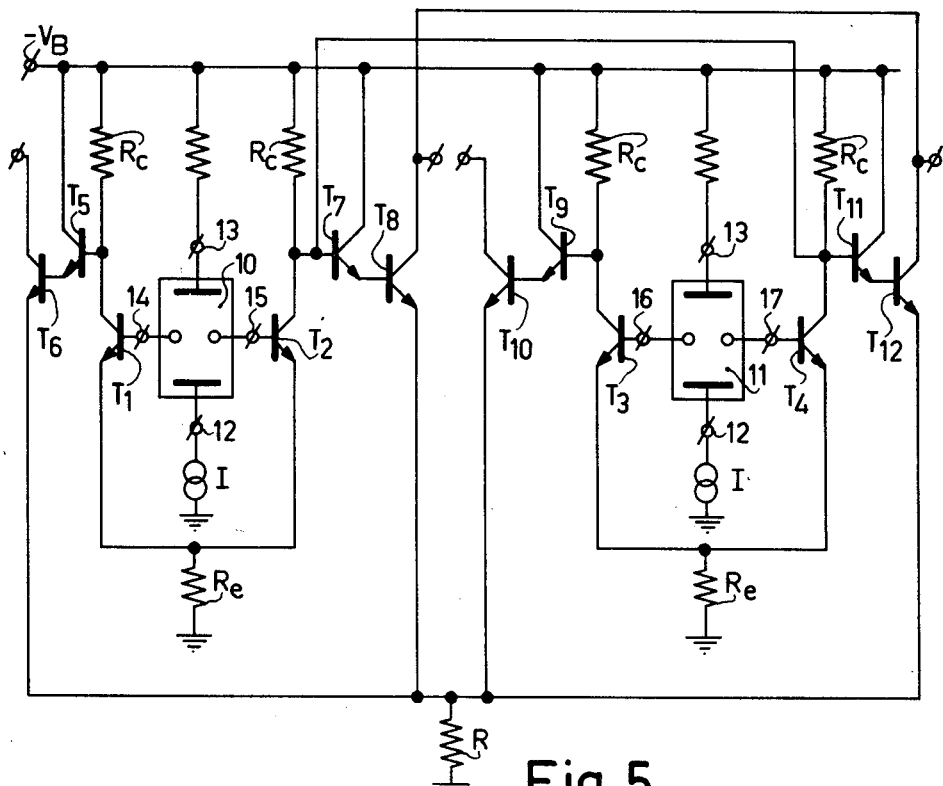

The invention will be described in more detail with reference to the drawing, in which:

FIG. 1 schematically and in perspective shows a brushless d.c. motor according to the invention, FIG. 2 shows in more detail a magnetically coded disc with two rings which are magnetized in two mutually 120° different directions and two Hall elements, FIG. 3 shows the Hall voltages produced in the Hall elements of FIG. 2 when the disc of FIG. 2 is rotated, FIG. 4 is a vector diagram for deriving a third phase from two other phases, and FIG. 5 shows two Hall elements included in an electronic circuit for producing a three-phase signal.

The machine of FIG. 1 comprises a permanently magnetized rotor body 1 which is disposed on a rotor shaft 2. The rotor body 1 is surrounded by stator coils 3 and a housing 4. On the rotor shaft a disc 5 is disposed on which two magnetically coded tracks 6 and 7 are arranged, which are 90° shifted relative to each other. The disc is mounted perpendicular to the rotational axis of the rotor. Parallel to said disc 5 an integrated circuit 8 is disposed, which comprises two magneto-sensitive elements which co-operate with the tracks 6 and 7. The integrated circuit 8 is mounted on a schematically shown support 9, which is fastened to the motor housing 4. For simplicity of the drawing the various electrical constructions are not shown. The electrical connections to the integrated circuit 8 may, for example, be arranged on the support 9. The machine shown in FIG. 1 is a four-phase machine.

FIG. 2 is a perspective view of an embodiment of a disc 5 for a three-phase machine with two schematically shown Hall elements 10 and 11. The disc 5 is provided with two tracks 6 and 7 which are 120° shifted relative to each other. The tracks are then magnetized in such a way that the field-strength component perpendicular to the surface of the ring is a sinusoidal pattern as a function of the location at the ring, which in the Figure is schematically indicated by the arrows. The integrated circuit 8 comprises the two Hall elements 10 and 11 and electronic circuitry, not shown. The various electrical leads also are not shown. As is known, a Hall element consists of a semiconductor material through which a current is passed between the connection points 12 and 13. In a direction perpendicular to the direction of said current the Hall voltage is taken off. In the drawing this is between the connection points 14 and 15 and points 16 and 17 respectively for the Hall elements 10 and 11. These Hall voltages are proportional to the field strength component perpendicular to the current direction and perpendicular to the Hall elements.

When the position of the disc is represented by the angle $\phi$ and the North-South magnetizing directions are as indicated by the arrows in FIG. 2 then FIG. 3 shows the corresponding Hall voltages $V_1$ and $V_2$, which are available between the connection points 14, 15 and 16, 17 respectively, as a function of the angle $\phi$. As appears from FIG. 3, $V_2$ is a signal which is 120° phase-shifted relative to the signal $V_1$.

When the inverse signals of the signals $V_1$ and $V_2$, i.e. the 180° phase-shifted signals, are also available, a third phase $V_3$ can simply be obtained, as is evident from the vector diagram of FIG. 4. The third phase $V_3$ is obtained by addition of the inverse signals of $V_1$ and $V_2$.

FIG. 5 shows an electronic circuit which includes two Hall elements 10 and 11. The Hall elements 10 and 11 are designated in accordance with FIG. 2 and are included between the bases of transistor pairs $T_1$, $T_2$ and $T_3$, $T_4$ respectively, which are connected as differential amplifiers. Each pair of transistors has a common emitter resistor individual $R_e$ and individual collector resistors $R_c$, the two emitter resistors $R_e$ and the collector resistors $R_c$ being chosen to be equal to each other for the sake of simplicity. Owing to this circuit arrangement, when a disc in accordance with FIG. 2 is used, the signal voltage across the collector resistor of transistor $T_1$ and the signal voltage across the collector resistor of transistor $T_3$ will be in accordance with the signals $V_1$ and $V_2$ respectively in FIG. 3. The signal voltages across the collector resistors of the transistors $T_2$ and $T_4$ then correspond to $-V_1$ and $-V_2$ respectively. When the collectors of the transistors $T_2$ and $T_4$ are interconnected, as shown in FIG. 5, the sum of the collector currents of transistors $T_2$ and $T_4$ will flow through the two parallel-connected collector-resistors $R_c$ and produces a voltage across them in accordance with $-(V_1+V_2)/2$, or the third phase $V_3$, as will appear from the vector diagram of FIG. 4. The collector voltages of the transistors $T_1$, $T_2$, $T_3$ and $T_4$ are amplified by the respective amplifier circuits ($T_5$, $T_6$), ($T_7$, $T_8$), ($T_9$, $T_{10}$) and ($T_{11}$, $T_{12}$). As the collectors of the transistors $T_2$ and $T_4$ are interconnected, the amplifier circuits $T_7$, $T_8$ and $T_{11}$, $T_{12}$ amplify the same signals so that the collectors of the transistors $T_8$ and $T_{12}$ may also be interconnected. The various amplifier circuits are then dimensioned and biassed so that the transistors $T_6$, $T_8$, $T_{10}$ and $T_{12}$ can be bottomed by the signals $V_1$, $V_2$ and $V_3$, squarewave output signals then are available at the collectors of the transistors $T_6$, $T_8$, $T_{10}$ and $T_{12}$, whose amplitudes are determined by the amount of saturation of the various transistors. As a result, the three phases are of equal amplitude and the voltage drop across the output transistors $T_6$, $T_8$, $T_{10}$ and $T_{12}$ is minimum when these transistors are in the bottomed state and drive the various stator coils. The machine is then assumed to have three stator coils which are included in the collector circuits of the transistors $T_6$, $T_{10}$ and the common collector circuit of the transistors $T_8$, $T_{12}$ respectively. The transistors $T_6$, $T_8$, $T_{10}$ and $T_{12}$ are connected in a common emitter arrangement and constitute a "four-transistor differential amplifier". In the case of sufficiently large drive signals at the bases of these transistors, this ensures that each time only one stator coil is energized.

An advantage of the circuit arrangement of FIG. 5 is that if the connection line between the collectors of the transistors $T_2$ and $T_4$ and the connection line between the collectors of the transistors $T_8$ and $T_{12}$ are arranged outside the integrated circuit, this integrated circuit may also be used in a four-phase machine according to the invention by simply dispensing with the said connections.

If the circuit arrangement of FIG. 5 is not required to be used for both a three and a four-phase machine, it suffices to interconnect the Hall electrodes 15 and 16. The associated parts of the electronic circuit, namely transistors $T_2$, $T_7$, $T_8$ and transistors $T_3$, $T_9$, $T_{10}$ respectively may then be provided jointly.

It is obvious that the invention is not limited to the embodiments shown. The magnetically coded tracks may for example be disposed on a drum-shaped body and even on a non-magnetized part of the rotor body.

Neither are the number of tracks, phases and magneto-sensitive elements and the positions occupied limited to the examples given. In respect of the magnetic code on the tracks, numerous modifications are possible, such as variations of the field strength and field direction along the circumference of the coded ring, for example for generating rectangular or sawtooth-shaped signals. Moreover, all embodiments shown are also possible with magneto-sensitive elements which are or are not accommodated on one carrier plate, instead of being incorporated in an integrated circuit. In place of Hall elements various other magneto-sensitive elements may be used, such as for example magneto-sensitive resistors, while the term "magnetically coded track" is not limited to the example shown in FIG. 2. For example, a fully magnetized disc is also possible.

What is claimed is:

1. An electric machine including an electronic commutator comprising, a magnetic rotor, a plurality of stator coils disposed in flux-coupling relation to said rotor, switching means for selectively applying electric current to the stator coils as a function of the rotor position, a member coupled to the rotor to rotate in synchronism therewith and comprising a plurality of magnetically coded tracks disposed thereon, and a plurality of magnetosensitive elements individually arranged in magnetic coupling relationship with said magnetically coded tracks for selectively operating said switching means as determined by the rotor position.

2. An electric machine as claimed in claim 1 wherein the magnetically coded tracks are arranged in concentric rings on a disc-shaped body which is disposed on the rotor shaft substantially perpendicular to the rotational axis of the rotor.

3. An electric machine as claimed in claim 2, characterized in that the magneto-sensitive elements are all disposed on a single carrier plate.

4. An electric machine as claimed in claim 3, characterized in that said carrier plate comprises a semiconductor crystal in which said magneto-sensitive elements are incorporated together with an amplifier circuit as a part of an integrated circuit which amplifies the signals from the magneto-sensitive elements, and means coupling the outputs of said amplifier circuit to the stator coils.

5. An electric machine as claimed in claim 3, characterized in that n magneto-sensitive elements are arranged on the one carrier plate and are spaced through angles of $\phi_i$ relative to a first magneto-sensitive element, $i$ being equal to $2 \ldots n$, and that the tracks which co-operate with the corresponding magneto-sensitive elements are spaced through angles of $360°/n \, (i-1) - \phi_i$ relative to a first track.

6. An electric machine as claimed in claim 1 wherein said member comprises at least two circular magnetic tracks, said magnetic tracks each having a magnetization which is a function of the angular position on said member so as to have an angular displacement relative to one another.

7. An electric machine as claimed in claim 1 wherein said plurality of stator coils comprise first, second and third stator coils and said plurality of magnetosensitive elements comprise first and second Hall elements each having first and second Hall output electrodes, and wherein said switching means comprises first amplifier means connecting the first Hall electrode of the first Hall element to the first stator coil, second amplifier means connecting the first Hall electrode of the second Hall element to the second stator coil and third amplifier means connecting the second Hall electrodes of the first and second Hall elements to the third stator coil in a manner such that the current applied to the third stator coil is determined by the sum of the signals appearing at said second Hall electrodes.

8. A brushless motor comprising, a permanent magnet rotor, a plurality of stator windings disposed in spaced relation around the rotor and in torque-producing relation therewith, switching means for selectively coupling a source of voltage to the stator windings as a function of the rotor position, a member coupled to the rotor for rotation therewith and comprising a plurality of magnetically coded tracks disposed thereon, and a plurality of magnetosensitive elements individually arranged in magnetic coupling relationship with said magnetically coded tracks for selectively operating said switching means as determined by the rotor position, said tracks being coded so that the magnetosensitive elements can be positioned in relation to said tracks independently of the number of stator windings or the spaced relationship thereof.

9. A motor as claimed in claim 8 comprising three stator windings arranged to operate as a three-phase machine, said plurality of magnetosensitive elements comprise two Hall-effect devices individually magnetically coupled to two coded tracks on said member which are relatively phase shifted by an angle of 120° for deriving first and second 120° phase-shifted control signals which are coupled to first and second switching devices connected to control the flow of current from said voltage source to first and second ones of said stator windings, circuit means responsive to the output signals of said two Hall-effect devices for combining same so as to derive a third control signal having a 120° phase shift relative to said first and second control signals, said third control signal being operative to control a third switching device connected to control the flow of current from the voltage source to a third one of said stator windings.

10. A motor as claimed in claim 8 wherein said member comprises a disc-shaped body mounted to rotate with the rotor and wherein the magnetically coded tracks are arranged in concentric circles on the disc-shaped body and are sinusoidally magnetized with a relative phase shift between at least two of said tracks.

11. A motor as claimed in claim 8 wherein the magneto-sensitive elements are all disposed in a single wafer composed of a semiconductor material.

12. A motor as claimed in claim 8 wherein the magnetically coded tracks are arranged in concentric circles on said member and with a relative phase shift between the tracks, and said plurality of magnetosensitive elements are disposed on a single fixed member and along a line radial to said concentric circles.

* * * * *